US009807549B2

(12) United States Patent
Yang et al.

(10) Patent No.: US 9,807,549 B2
(45) Date of Patent: Oct. 31, 2017

(54) SYSTEMS AND METHODS FOR ADAPTIVE MULTI-FEATURE SEMANTIC LOCATION SENSING

(71) Applicant: INTEL CORPORATION, Santa Clara, CA (US)

(72) Inventors: Lei Yang, Hillsboro, OR (US); Xue Yang, Arcadia, CA (US); Donnie H. Kim, Santa Clara, CA (US); Xiaochao Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/335,026

(22) Filed: Jul. 18, 2014

(65) Prior Publication Data

US 2016/0021494 A1    Jan. 21, 2016

(51) Int. Cl.
*H04W 4/02* (2009.01)
*H04W 4/00* (2009.01)
*H04W 4/04* (2009.01)

(52) U.S. Cl.
CPC ............. *H04W 4/02* (2013.01); *H04W 4/008* (2013.01); *H04W 4/043* (2013.01)

(58) Field of Classification Search
CPC ........ H04L 67/18; H04W 4/02; H04W 4/043; G01C 21/206; H04M 2242/30; H04M 2242/15
See application file for complete search history.

(56) References Cited

U.S. PATENT DOCUMENTS

| 7,738,884 | B2 * | 6/2010 | Cheung | ................. G01S 5/0226 455/404.2 |
| 8,744,352 | B2 | 6/2014 | Pochop, Jr. | |
| 2004/0236850 | A1 * | 11/2004 | Krumm | ................... H04L 29/06 709/224 |
| 2006/0046709 | A1 * | 3/2006 | Krumm | .............. H04N 21/4126 455/422.1 |
| 2010/0120422 | A1 * | 5/2010 | Cheung | ................. G01S 5/0226 455/434 |
| 2013/0072216 | A1 * | 3/2013 | Ledlie | ................... H04W 4/043 455/456.1 |

(Continued)

OTHER PUBLICATIONS

Search Report from Taiwan Application No. 104118621 dated Jun. 22, 2016. (10 pgs., including 1 pg. of translation).

*Primary Examiner* — Bobbak Safaipour
*Assistant Examiner* — Devan Sandiford
(74) *Attorney, Agent, or Firm* — Sutherland Asbill & Brennan LLP

(57) ABSTRACT

This disclosure describes systems, methods, and computer-readable media related to employing adaptive multi-feature semantic location sensing methods to estimate the semantic location of a mobile device. A set of wireless data scans associated with one or more access points at one or more locations may be received. One or more features of the one or more locations may be identified, based upon the set of wireless data scans wherein the features are associated with one or more location metrics. At least one of the one or more access points may be determined to be associated with a first location based upon, at least in part, the set of wireless data scans. A first classifier for the first location may be generated based upon, at least in part, the one or more features and the associated access points.

14 Claims, 7 Drawing Sheets

(56) References Cited

U.S. PATENT DOCUMENTS

| | | | |
|---|---|---|---|
| 2013/0080457 A1* | 3/2013 | Narayanan | H04W 4/021 707/758 |
| 2013/0113655 A1* | 5/2013 | Shen | G01S 19/42 342/357.31 |
| 2013/0339383 A1* | 12/2013 | Song | G06F 17/3087 707/769 |
| 2014/0171099 A1* | 6/2014 | Sydir | H04W 4/021 455/456.1 |
| 2014/0171118 A1 | 6/2014 | Marti et al. | |
| 2014/0172953 A1* | 6/2014 | Blanksteen | H04W 4/02 709/203 |
| 2015/0181405 A1* | 6/2015 | Dua | H04W 4/02 455/456.3 |

* cited by examiner

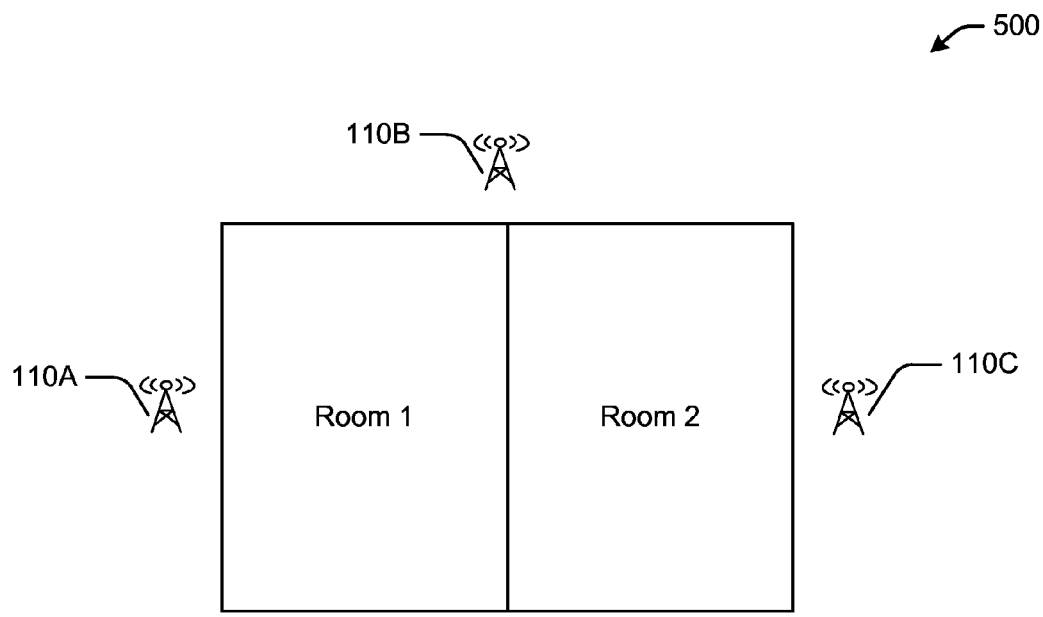
FIG. 5a
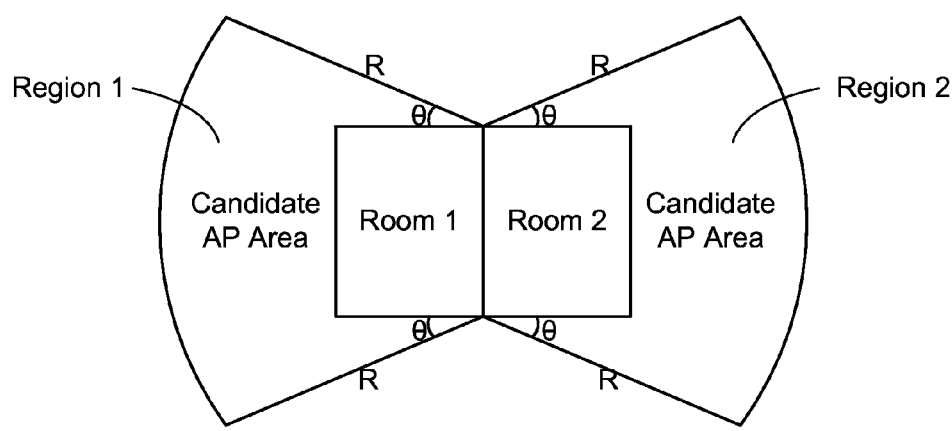
FIG. 5b
FIG. 5

SYSTEMS AND METHODS FOR ADAPTIVE MULTI-FEATURE SEMANTIC LOCATION SENSING

BACKGROUND

Mobile devices are often continuously connected to one or more networks, such as a wireless network. With the recent explosion of smart mobile devices and location-based services, reliable and accurate location sensing has become increasingly important. While many indoor location applications and services use the user's physical location or geo-coordinate as input, such common location representation usually carries little semantic meaning to a user and may not provide detailed information about the user's location.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 5a is a block diagram including various hardware and software components of the illustrative system architecture depicted in FIG. 1 in accordance with one or more embodiments of the disclosure.

FIG. 5b is a block diagram including various hardware and software components of the illustrative system architecture depicted in FIG. 1 in accordance with one or more embodiments of the disclosure.

DETAILED DESCRIPTION

Figure 1:
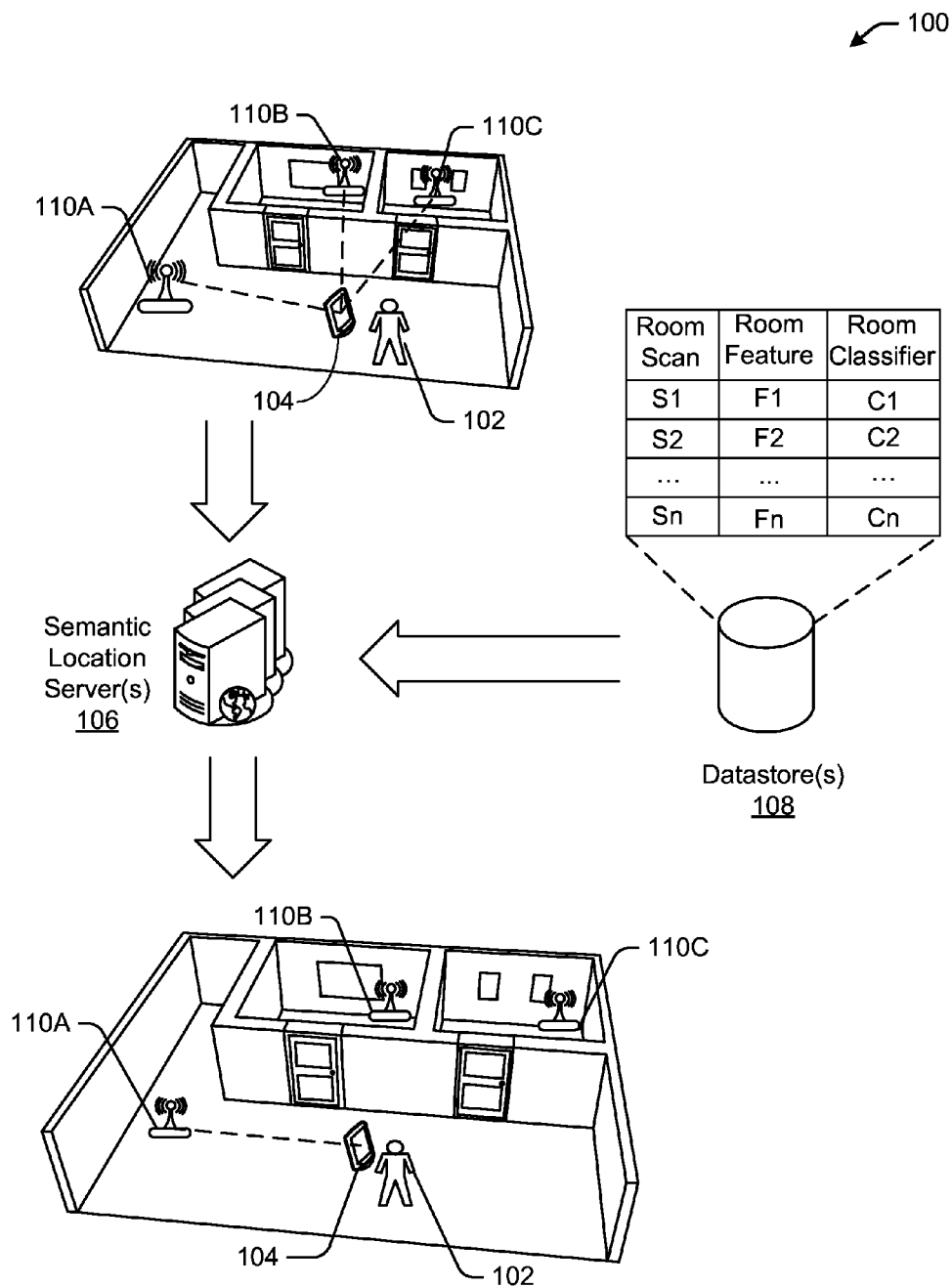
FIG. 1 depicts an illustrative data flow between various components of an illustrative system architecture for an adaptive multi-feature semantic location sensing in accordance with one or more embodiments of the disclosure.

This disclosure relates to, among other things, systems, methods, computer-readable media, techniques, and methodology for an adaptive multi-feature semantic location sensing for mobile device detection. Location-based applications may require detailed information of a user's location as opposed to coordinate information of the user's physical location. For example, it may be beneficial to determine the likelihood of a user being located at an Italian restaurant or at a library or at a conference room, etc., as opposed to simply determining that a user is located at a certain geographic location, such as the latitude and longitude coordinates of a geographic location which are typically provided by systems such as a global positioning system (GPS). It is understood that semantic location information may include location details such as "Joe's Italian Restaurant on main street," "home at 555 aspen drive," etc. This type of semantic location information provides descriptive details about a location as opposed to simply physical coordinates.

The use of GPS location detection for in indoor environments may be inadequate. Some of the existing wireless technologies may be utilized in determining user positioning (e.g., Wi-Fi, ultra wideband (UWB), ZigBee™, GSM, CDMA, LTE, etc.). Techniques using fixed features and parameters are not adequate because room features, such as walls, access points signal strengths, etc., vary significantly across office/home environments, or even across different rooms inside a house.

In some embodiments, semantic location information of users may be determined by collecting wireless data scans from access points that may be in the proximity of a user at a certain location. For example, in order to determine the semantic location of a user within an office building, the system may use available access points that may be proximate to the user's device (e.g., smartphone, tablet, laptop, etc.). The user device (e.g., mobile device 104) may detect these access points and may collect wireless data related to, for example, the power levels of the signals received from these access points, and may use that information in conjunction with statistical calculations to determine the likelihood of a user being located in a particular location.

In some embodiments, a set of statistical metrics may be used to calculate a set of location features that may be beneficial to define that location based on the collected wireless data scans from one or more access points. Using Wi-Fi as an example, Wi-Fi scans may include RSSI measurements that may indicate the power level being received by the mobile device antenna from access points that are in proximity of that mobile device. It is understood that the higher the RSSI number, the stronger the signal.

Statistical metrics such as standard Euclidean, which is an ordinary distance between two points, may be used to determine a statistical difference between these RSSI measurements in order to determine the likelihood that a person is located in a particular location.

A machine learning approach may be utilized in order to determine indoor semantic location information across different environments (e.g., office building, mall, home, etc.). Machine learning techniques may be used to identify candidate room feature metrics that may be used to determine the semantic location information of a particular location. Examples of feature metrics may be, Standard Euclidean, a Pearson's correlation coefficient, a Cosine correlation coefficient, a Spearman rank order, a Hamming distance, or a Normalized Euclidean distance, etc. A unique classifier for each semantic location may be created using the candidate feature metrics such that the classifier may be considered an indicator that a user is located at a particular location (e.g., at a restaurant, in a conference room, etc.). The use of a classifier for determining the likelihood of a user being located in a particular semantic location may improve the accuracy in challenging environments where the wireless properties of access points may gradually change over time.

For example, if applying feature metrics "Spearman rank order" and "Hamming distance" to the wireless scans in room A generate a higher confidence that a user is likely in a room A, then a classifier may be created for room A. The classifier may later applied to new collected wireless scans to determine the likelihood that a user is in room A. In effect, a list of classifiers associated with a list of feature metrics that generate a high confidence that a user is in a particular location may be generated for each of the possible locations.

As explained above, wireless scans collected from a number of access points that may be in proximity of a mobile device may be used to determine the likelihood that a user is in a particular location. In some embodiments, it may be necessary to remove one or more access points at a particular location if the one or more access points introduce erroneous wireless scans due to their placement within that particular location. For example, an access point may be situated in front of a wall that separates two rooms, which may cause conflicting information as to whether a user is in the first room or the second room, simply because the access point is situated between the two rooms. It is understood that the above is only an example, often access point that may cause erroneous wireless scans and that other situations that may result in an unreliable access point.

In another embodiment, the determination to remove one or more access points may be based on the layout of a location. For example, if one or more access points are situated within one or more defined regions of a location, The one or more access points may be considered part of the pool of access points that may be used to determine the likelihood that a mobile device is located in a particular location. If some access points are situated outside the defined regions of the location, then these access points may not be used in the location determination of the mobile device. A region may be defined by an angle and a radius relative to one or more walls of a room. Access points that may be located within that region may be considered as candidate access points to be used for determining the likelihood that a mobile device is in a particular location, while access points located outside that region may not be considered a candidate access points in the location determination of the mobile device. It is understood that the above is only an example of defining a region to select candidate access points that may be used to determine the location of a mobile device.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

FIG. 1 depicts an illustrative data flow between various components of an illustrative system architecture for multi-feature semantic location sensing of mobile devices in accordance with one or more embodiments of the disclosure.

One or more illustrative mobile device(s) 104 operable by one or more user(s) 102 are depicted in FIG. 1. The mobile device(s) 104 may include any suitable processor-driven computing device including, but not limited to, a desktop computing device, a laptop computing device, a server, a smartphone, a tablet, wearable wireless device (e.g., bracelet, watch, glasses, ring, etc.) and so forth. For ease of explanation, the mobile device(s) 104 may be described herein in the singular (e.g., mobile device 104); however, it should be appreciated that multiple mobile device(s) 104 may be provided.

The mobile device 104 may communicate with one or more location devices 110A, 110B, and/or 110C (collectively the location device(s) 110). The location device(s) 110 may be configured with a unique identifier. The location device(s) 110 may provide wireless signal coverage for a predefined area. The mobile device 104 may capture wireless signal measurements associated with the communication between the mobile device 104 and the location device(s) 110. The measurements may include one or more received signal strength indicator (RSSI), which is a measurement of the power present in a received signal. For example, the location device(s) 110 may be a wireless access point, a router, a server, another mobile device, or any device that may wirelessly communicate with the mobile device 104 to determine the semantic location of the mobile device 104.

Location information may be collected from the mobile device itself. For example, sensors (e.g., accelerometers, gyroscopes, or the like) associated with the mobile device 104 may capture inertial data of the mobile device 104. In some embodiments, the mobile device 104 may include an inertial navigation system or the like to capture inertial data associated with the mobile device 104. An inertial navigation system is a navigation aid that utilizes motion sensors (e.g., accelerometers) and rotation sensors (e.g., gyroscopes) to continuously calculate via dead reckoning the position, orientation, and velocity (e.g., direction and speed of movement) of the mobile device 104 without the need for external references.

Wireless data scans may include data such as unique identifier(s) of the location device(s) 110, wireless measurements, such as RSSI measurements indicating the power level received by the mobile device antenna from access points, information gain measurements, and/or inertial. The wireless data scans may be collected by the mobile device 104 and may be sent to a semantic location server 106 to be used for the location determination of the mobile device 104. The semantic location server 106 may also receive data from one or more datastore(s) 108, such as floor map information for a specific location, wireless measurements (e.g., room scans S1, S2 . . . , Sn), identifying information of the location device(s) 110, room features (e.g., room features F1, F2 . . . Fn) that may be selected that provide the highest confidence that a user is in a particular room, room classifiers (e.g., C1, C2, . . . , Cn) that may be used in conjunction with the specified room feature(s) that may be used for each room, and/or radio fingerprint data associated with the location device(s) 110. Radio fingerprinting data may include information that identifies the location device(s) 110. An electronic fingerprint makes it possible to identify a wireless device by its unique radio transmission characteristics. It is understood that information gain is a statistical computation concept from information theory, which is a branch applied mathematics that relies on the measure of entropy within sampled data.

The one or more semantic location server (s) 106 may be configured to determine a current location of the mobile device 104 based at least in part on the inertial data, wireless measurement data (e.g., RSSI measurement, information gain, or any wireless measurements related to quality of signals received for one or more location devices), location device fingerprint data, and/or floor map information. The location may be used to provide location-based services to the identified mobile device 104. For example, the one or more semantic location servers 106 may determine the location of the user device (e.g., mobile device 104) in two stages, a training stage and a detection stage. During the training stage, the one or more semantic location server 106 may receive wireless data scans from the mobile device 104, may perform statistical analysis on the received wireless data scans using a set of statistical metrics to determine a list of classifiers on a per room basis. For example, wireless data scans from room 1 (e.g., S1) may be collected by the mobile device 104. Further, the mobile device 104 location may be determined by applying one or more feature or location metrics that may represent that the mobile device 104 is located in a particular room (e.g., room 1). For example, calculating the cosine_median, spearman_median, and hamming_median, may provide a better detection accuracy than applying other feature or location metrics such as Euclidean_median in the location determination of the mobile device 104.

The datastore(s) 106 may store the wireless data scans (e.g., S1, S2, . . . Sn) for a number of rooms (room 1, room 2, . . . room n). The datastore (s) 106 may store room feature (e.g., F1, F2, . . . , Fn), which may provide a list of feature or location metrics that may be used to determine the likelihood that a mobile device 104 is in a particular location. The datastore(s) 106 may further store room classifiers (e.g., C1, C2, . . . , Cn) for each of the rooms such that a classifier may be used to determine the location of the mobile device 104.

During the detection stage, the list of classifiers may be applied against newly acquired wireless data scans in order to determine the likelihood that the mobile device 104 may be at a particular location. For example, in order to determine that the mobile device 104 is located in room 1, the one or more semantic location server (s) 106 may run the list of room classifiers against newly acquired wireless data scans by the mobile device 104. Running the classifiers against newly acquired wireless data scans may include applying the feature or location metrics that were determined to be representative of room 1 in the training stage.

Figure 2:
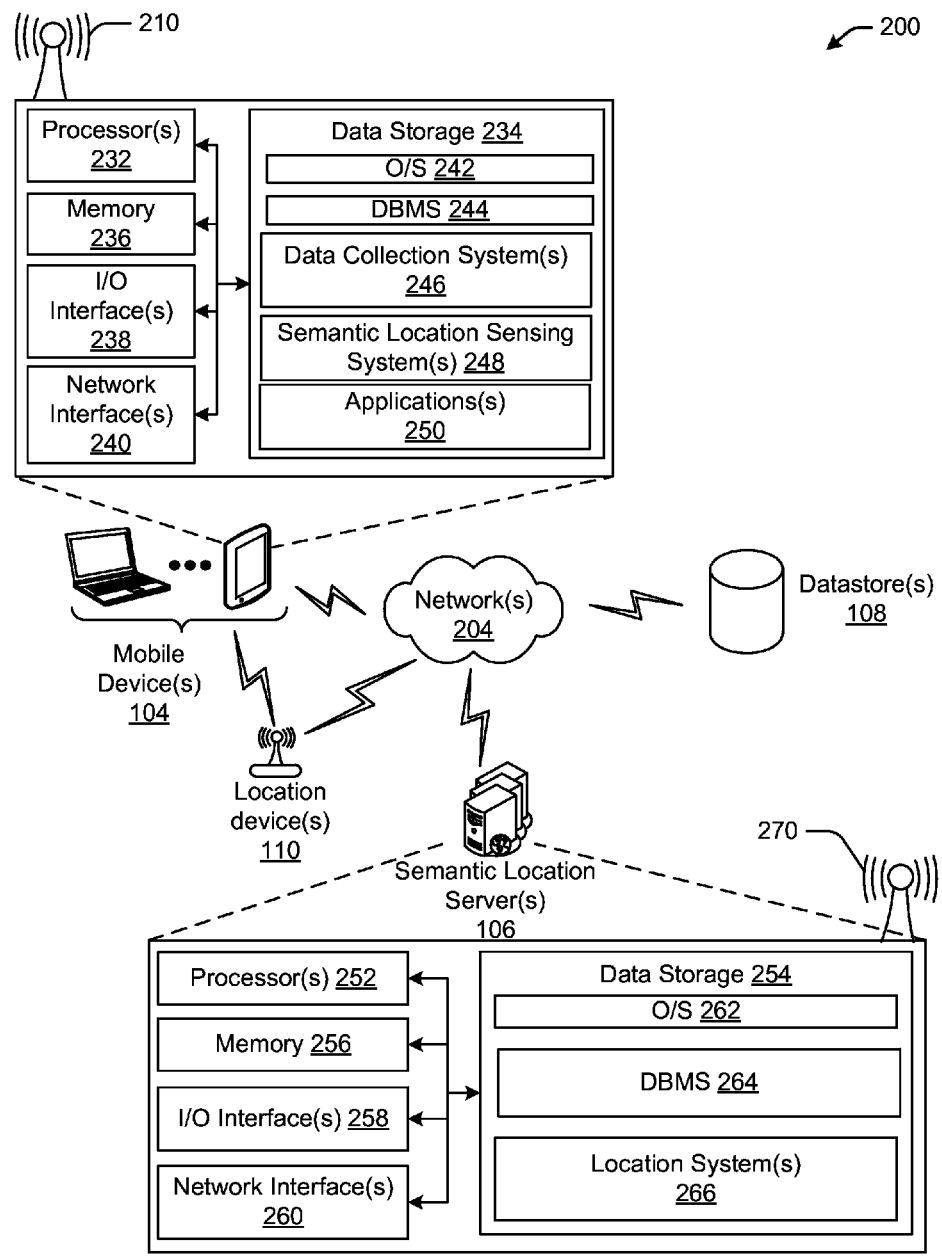
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more mobile device(s) 104 operable by one or more user(s) 102, one or more datastore(s) 108, location device(s) 110, and/or one or more semantic location server(s) 106. The mobile device(s) 104, the datastore(s) 108 and the server(s) 106 may include any of the types of devices described through reference to FIG. 1.

Any of the mobile device(s) 104, datastore(s) 108, the location device(s) 110, and/or server(s) 106 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the mobile device(s) 104, the datastore(s) 108, the location device(s) 110, and/or server(s) 106 may include one or more communications antennae (e.g., antennas 210 and 270). Communications antenna may be any suitable type of antenna corresponding to the communications protocols used by the mobile device(s) 104, the datastore(s) 108, the location device(s) 110, and/or server(s) 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. Any of the mobile device(s) 104, the datastore(s) 108, the location device(s) 110, and/or the server(s) 106 may include transmit/receive (transceiver) or radio components that may include any suitable radio and/or transceiver for transmitting and/or receiving radio frequency (RF) signals in the bandwidth and/or channels corresponding to the communications protocols utilized by any of the mobile device(s) 104, the datastore(s) 108, the location device(s) 110, and/or the server(s) 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

The mobile device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, an operating system 242 and application(s) 250. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the mobile device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The mobile device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The mobile device(s) 104 may further include network interface(s) 240 that facilitate communication between the mobile device(s) 104 and other devices of the illustrative system architecture 200 (e.g., the datastore(s) 108, server(s) 106, etc.) or application software via the network(s) 204. The mobile device(s) 104 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 234, various systems and applications, or the like may be stored therein that may comprise computer-executable instructions that when executed by the processor(s) 232 cause various operations to be performed. The memory 236 may have loaded from the data storage 234 one or more operating systems (0/S) 242 that may provide an interface between other application software (e.g., dedicated applications, a browser application, a web-based application, a distributed client-server application, etc.) executing on the mobile device 104 and the hardware resources of the mobile device 104. More specifically, the O/S 242 may include a set of computer-executable instructions for managing the hardware resources of the mobile device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., the datastore(s) 108). The DBMS 244 may use any of a variety of database models (e.g., relational model, object model, etc.) and may support any of a variety of query languages.

The data storage 234 may additionally include various other systems that may include computer-executable instructions for supporting a variety of associated functionality. For example, the data storage 234 may include one or more data collection system(s) 246, one or more semantic location sensing system(s) 248, and/or one or more application(s) 250.

The data collection system(s) 246 may include computer-executable instructions that in response to execution by the processor(s) 232 cause operations to be performed including generating and/or obtaining wireless data, such as wireless signal strengths. The data collection system(s) 246 may be responsible for receiving or otherwise obtaining information associated with a mobile device(s) 104.

The semantic location sensing system(s) 248 may include computer-executable instructions that in response to execution by the processor(s) 232 cause operations to be performed including receiving or otherwise obtaining data collected by the data collection system(s) 246. For example, the semantic location sensing system(s) 248 may collect wireless data scans from the mobile device 104 during a training stage through one or more location device(s) 110 and may perform statistical analysis using feature or location metrics to calculate a set of location features that may be beneficial to define a location based on the collected wireless data scans from one or more location device(s) 110. The set of location features may be used to determine a list of room classifiers that may be used during a detection stage where each location may be associated with a unique classifiers.

In some embodiments, the semantic location sensing system(s) 248 may receive data from other mobile device(s) 104, and/or location device(s) 110 and/or one or more semantic location server(s) 106, and may determine a location of the mobile device 104 based on the information received. Although, it shown that the semantic location sensing system(s) 248 may determine the location of the mobile device 104, it is understood that this determination may also be implemented on the semantic location server(s) 106.

The application(s) 250 may include computer-executable instructions that in response to execution by the processor(s) 232 cause operations to be performed including executing of different functionality specific to the application(s) 250. For example, application(s) 250 may provide the determined location information (e.g., the likelihood that the mobile device is in room A) to location-based services (e.g., targeted application based on the location determination, such as, games, ads, alerts, etc. . . . ). In another embodiment, the application(s) 250 may initiate the location determination based upon collected wireless data scans, where the application (s) 250 may determine the likelihood that a mobile device 104 is in a certain location by performing statistical analysis using a set of feature or location metrics to determine a list of room classifiers and then using these classifiers to determine the likelihood that the mobile device 104 is in a particular location.

Within the data storage 234, one or more systems may be stored. As used herein, the term system may refer to a functional collection of instructions that may be executed by the one or more processor(s) 232. For ease of description, and not by way of limitation, separate systems are described. However, it is understood that in some implementations the various functions provided by the systems may be merged, separated, and so forth. Furthermore, the systems may intercommunicate or otherwise interact with one another, such that the conditions of one affect the operation of another.

The semantic location server(s) 106 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the semantic location server(s) 106, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The semantic location server(s) 106 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The semantic location server(s) 106 may further include network interface(s) 260 that facilitate communication between the semantic location server(s) 106 and other devices of the illustrative system architecture 200 (e.g., mobile device(s) 104, the datastore(s) 108, etc.) or application software via the network(s) 204. The semantic location server(s) 106 may additionally include one or more input/output (I/O) interfaces 258 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 254, various programs, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the semantic location server(s) 106 and the hardware resources of the semantic location server(s) 106. More specifically, the O/S 262 may include a set of computer-executable instructions for managing the hardware resources of the semantic location server(s) 106 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 108). The DBMS 264 may use any of a variety of database models (e.g., relational model, object model, etc.) and may support any of a variety of query languages.

The data storage 254 may additionally include various other systems that may include computer-executable instructions for supporting a variety of associated functionality. For example, the data storage 254 may include one or more data collection system(s) 266 and/or one or more location system(s) 268.

The location system(s) 266 may include computer-executable instructions that in response to execution by the processor(s) 252 cause operations to be performed including obtaining wireless data scans, analyzing the wireless data scans, identifying a location of the mobile device(s) 104 based at least in part on the analyzed data, and/or generating one or more confidence levels associated with the determined location and/or one or more possible locations. Although, it shown that the location system(s) 266 may determine the location of the mobile device 104, it is understood that this determination may also be implemented on the mobile device 104. In some embodiments, the location system(s) 268 may continuously recalculate and/or identify a current location of the mobile device(s) 104 based on wireless data scans received from the mobile device(s) 104. For example, location system(s) 266 may provide location determination (e.g., the likelihood that the mobile device is in room A) to location-based services (e.g., targeted application based on the location determination, such as, games, ads, alerts, etc. . . . ). Some of the location-based services may be providing the user with nearest bank, the location of a friend, commerce related services (e.g., coupons or ads directed at users based on their location), weather services, and/or location-based games. As explained above, GPS systems may be insufficient in providing useable information other than the physical coordinates of a mobile device (e.g., the mobile device 104). For example, if a location-based application receives the coordinates of the mobile device 104 while inside a mall, the coordinate information would be insufficient to determine at which store the mobile device 104 is located.

In another embodiment, the application(s) 250 may initiate the location determination based upon collected wireless data scans, where the application (s) 250 may determine the likelihood that a mobile device 104 is in a certain location by performing statistical analysis using a set of feature or location metrics to determine a list of room classifiers and then using these classifiers to determine the likelihood that the mobile device 104 is in a particular location. It is understood that the above are only examples of location-based services and that other location-based services may be utilized.

Within the data storage 254, one or more systems may be stored. As used herein, the term system may refer to a functional collection of instructions that may be executed by the one or more processor(s) 252. For ease of description, and not by way of limitation, separate systems are described. However, it is understood that in some implementations the various functions provided by the systems may be merged, separated, and so forth. It is understood that the determinations and calculations described as being performed by the location system(s) 268 of the semantic location server(s) 106 may, in some embodiments, be partially or fully performed by the semantic location sensing system(s) 248 of a mobile device(s) 104 and/or the location devices 110. Furthermore, the systems may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various systems have been depicted and described with respect to various illustrative components of the system architecture 200, it should be appreciated that the functionality described as being supported by the systems may be enabled by any combination of hardware, software, and/or firmware. It should further be appreciated that each of the above-mentioned systems may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular system may, in various embodiments, be provided at least in part by one or more other systems. Further, one or more depicted systems may not be present in certain embodiments, while in other embodiments, additional systems not depicted may be present and may support at least a portion of the described functionality and/or additional functionality. Further, while certain systems may be depicted and described as sub-systems of another system, in certain embodiments, such systems may be provided as independent systems.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Figure 3:
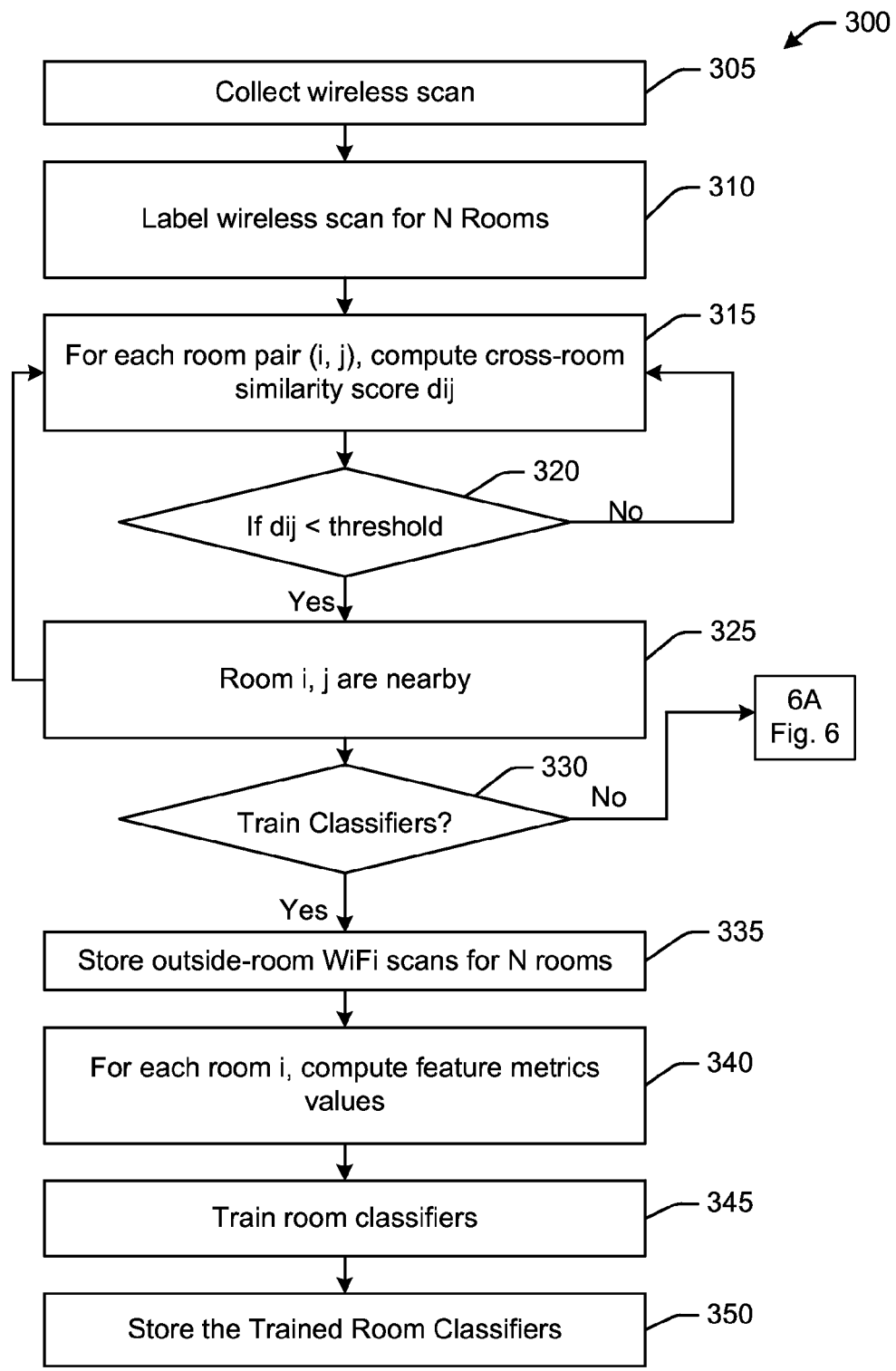
FIG. 3 is a flow diagram of an illustrative method for an adaptive multi-feature semantic location sensing for mobile device indoor localization in accordance with one or more embodiments of the disclosure.

FIG. 3 illustrates a flow diagram of illustrative process 300 for training classifiers for semantic location sensing systems in accordance with one or more embodiments of the disclosure.

In some embodiments, the semantic location sensing system(s) 248 may be configured to employ machine learning techniques to identify individual room features and construct a multi-feature classifier for each room correspondingly. Machine learning techniques may be used to identify the suitable room features (e.g., determining a set of statistical metrics that may be suitable to identify the room based upon the wireless data scans received from the location device(s) 110) and the suitable classifier of each room. Machine learning techniques may be configured to adapt to various different environments and learn the wireless differences between rooms to improve detection accuracy. The physical construction of rooms and walls may create strong signal attenuation to surrounding wireless signals, such as Wi-Fi signals. Therefore, each room may have its unique received wireless signal properties (e.g., Wi-Fi properties). For example, one particular room may receive signals from a specific set of location device(s) 110 (e.g., access points), with a unique combination of signal strengths from each of the respective location devices 104. A statistical metric that may be used to determine a feature of the signals may be the Euclidean distance, which is a mathematical algorithm to determine the distance between two points (e.g., between two rooms, two access points, two RSSI measurements, etc.) It is understood that RSSI is a generic radio receiver technology metric that may indicate the received power level of an RF device (e.g. access point). It is understood that the above is only an example, and other features may be employed.

Different indoor environments may generate different statistical values when applied to various wireless measurements in that location. For example, applying one statistical metric (e.g., Euclidean distance) to a set of wireless scans collected by the mobile device(s) 104 may generate different results from one location to another within the same room or between different rooms. mobile device(s) 104. In one embodiment, machine learning techniques may be employed to identify the unique room feature on individual room basis, and may be employed to construct a unique classifier for each room that may be used to determine the likelihood that a mobile device 104 is at a particular location. As explained above two stages in constructing a classifier may be employed: a training stage and a detection stage. For ease of definition, the generic term "room" may be used to represent a semantic location spot, although it may mean locations of other types, such as office cubicles and stores. For illustrative purposes, Wi-Fi protocol may be used as an example implementation of the methods and systems described above, however, any wireless protocol may equally be implemented.

Training Stage

At block 305, the semantic location sensing system(s) 248 may collect wireless scans. In some embodiments, the collected wireless scans may include wireless data measurements associated with the mobile device(s) 104 and one or more location device(s) 110 (e.g., access points) and inertial data associated with the mobile device(s) 104, such as signal strength, location device(s) 110 identification. The semantic location sensing system(s) 248 may receive wireless scan results (e.g., Wi-Fi scan results) from various rooms. There may be multiple ways to collect such room training dataset. For example, a user may take a manual survey to collect several Wi-Fi scans in each room, or the user may provide location information (e.g., a user may manually input that the user is located in conference room A for example). For example, a user may manually label a room with a certain descriptive term (e.g., bedroom, conference room A, etc.). Further, room information and corresponding wireless scans may also be learned automatically in the background using information such as time of the day, GPS coordinate, and previous room detection results.

At block 310, the collected wireless scan may be labeled and stored using the data collection system(s) 246. For example, $N_i$ reference Wi-Fi scans may be gathered inside room i, where each Wi-Fi scan may consist of a set of RSSI measurements from K APs (access points): $[S_1, S_2, \ldots S_K]$.

At block 315, the semantic location sensing system(s) 248 may compute cross-room similarities scores between each room pair (i, j). The semantic location sensing system(s) 248 may obtain both inside room and outside room wireless (e.g., Wi-Fi) scan samples in order to train a classifier for each room. For example Wi-Fi scans labeled for room i may be determined as training samples from inside room i. Wi-Fi scans that are not labeled for room i and are from adjacent rooms may be used to determine outside room training data. Adjacent rooms may be determined by the similarity of Wi-Fi properties between rooms. For example, the average cross-room Wi-Fi signal Euclidean distance (e.g., $D_{ij}$) may be computed between each pair of rooms as follows:

$$D_{ij}=\sqrt{(S_{i1}-S_{j1})^2+(S_{i2}-S_{j2})^2+\ldots+(S_{iK}-S_{iK})^2}$$

Where $S_{ij}$ may be the average signal strength of the $j^{th}$ AP (access point) inside room i.

At block 320, the semantic location sensing system(s) 248 may determine that room i and room j may be marked as adjacent to each other based upon the $D_{ij}$ value and a threshold. The threshold may be determined by the system administrator, the mobile device(s) 104, the semantic location server(s) 106, and/or the user(s) 102. For example, if the Euclidean distance Dij of Wi-Fi signals detected by a mobile device(s) 104, is less than 10, then it may be determined that rooms i and j are adjacent to each other. However, if the Euclidean distance Dij of the detected Wi-Fi signals by the mobile device(s) 104 is greater than 10 then it may be determined that rooms i and j are not adjacent to each other.

At block 325, the semantic location sensing system(s) 248 may add Wi-Fi scan data in room j to the outside training data for room i, and/or may add Wi-Fi survey data in room i to the outside training data for room j. Stated differently, scan data from outside one room may be determined to be scan data for inside another room.

At block 330, the semantic location sensing system(s) 248 may determine whether classifiers may be trained to represent one or more locations. In case classifier training is not necessary, the process branches to block 6A, FIG. 6, which may provide for additional features that will be discussed in more detail below.

At block 335, the data collection system(s) 246 may store the outside room, wireless scans (e.g., Wi-Fi scans) for N rooms.

At block 340, the semantic location sensing system(s) 248 may compute a set of location features based upon collected wireless data that may distinguish differences in feature metrics values representing each location. For example, each location may have one or more feature metrics that may be more suitable in representing the likelihood that a user (e.g., user 102) is located in that location. In consequence, a classifier may then be associated with those one or more feature metrics. These feature metrics may be statistical computation (e.g., Standard Euclidean, a Pearson's correlation coefficient, a Cosine correlation coefficient, a Spearman rank order, a Hamming distance, or a Normalized Euclidean distance, etc.) performed on a pair of data (e.g., between rooms, access points, wireless signal measurements, RSSI measurements, etc.) associated with a location. As explained above, a classifier may represent a set of features for a certain location that may determine the likelihood that a user is in a particular location.

In order to select which features are more suitable for a certain location statistical values may be determined on a pair of samples, such as rooms, Wi-Fi scans, etc., using a set of feature metrics (e.g., Standard Euclidean, a Pearson's correlation coefficient, a Cosine correlation coefficient, a Spearman rank order, a Hamming distance, or a Normalized Euclidean distance, etc.). For example, to determine features of a room A that may be suitable for determining the likelihood that a user is in that room, first, feature metrics M (e.g., Standard Euclidean, a Pearson's correlation coefficient, a Cosine correlation coefficient, a Spearman rank order, a Hamming distance, or a Normalized Euclidean distance, etc.) and the number of statistical values S (e.g., minimum, maximum, average, etc.) may be computed. Statistical values (e.g., minimum, maximum, etc.) may be calculated over a set of distance values (e.g., one inside sample vs. all other inside samples or one inside sample vs. all outside samples) may be used instead of an individual distance value to improve robustness. T For each of the feature metrics used above, the number of statistical values S (e.g., a minimum value, a maximum value, an average value, a standard deviation and/or a median value) may be computed. For example, if ten feature metrics (M=10) were used for determining the likelihood that a user is located in room A, and five different statistical values were computed (e.g., S=5), there may be 5*10 different features, annotated as Euclidean_min, Euclidean_max, . . . Hamming_min, etc.

Given $N_i$ reference Wi-Fi samples and $A_i$ adjacent Wi-Fi samples for room i, $N_i$ training data labeled as inside may be created and $A_i$ training data labeled as outside may be created. An inside training data may be created by selecting a single Wi-Fi reference sample from $N_i$ room i samples, computing distances against the rest of $N_{i-1}$ Wi-Fi sample for room i, and calculating S statistical values (e.g., minimum, maximum, average, etc.) over these $N_{i-1}$ values for each distance metric. An outside training data may be created by selecting a single adjacent Wi-Fi sample from $A_i$ samples, computing distances against the $N_i$ Wi-Fi samples from inside room i, and calculating S statistical values over these $N_i$ values for each distance metric.

At block 345, the semantic location sensing system(s) 248 may train various machine learning classifiers based on the above determined features. Continuing with the above example, the M feature metrics and the S statistical values may be used in conjunction with machine learning techniques in order to train a unique classifier for room A. Therefore, each room may be identified by applying the classifier against new wireless scans using machine learning techniques or suites. Some example of machine learning techniques may be using linear classifiers with lower computation complexity may be applied, such as, support vector machine (SVM), boosted decision stump, or decision-tree based classifiers (e.g., class J48 of Weka™). It is understood that Weka™ may be an open source java classifier suite, and that other machine learning classifier or software suite may be used.

At block 350, the data collection system(s) 246 may store the trained room classifiers for each of the N rooms.

Detection Stage

Figure 4:
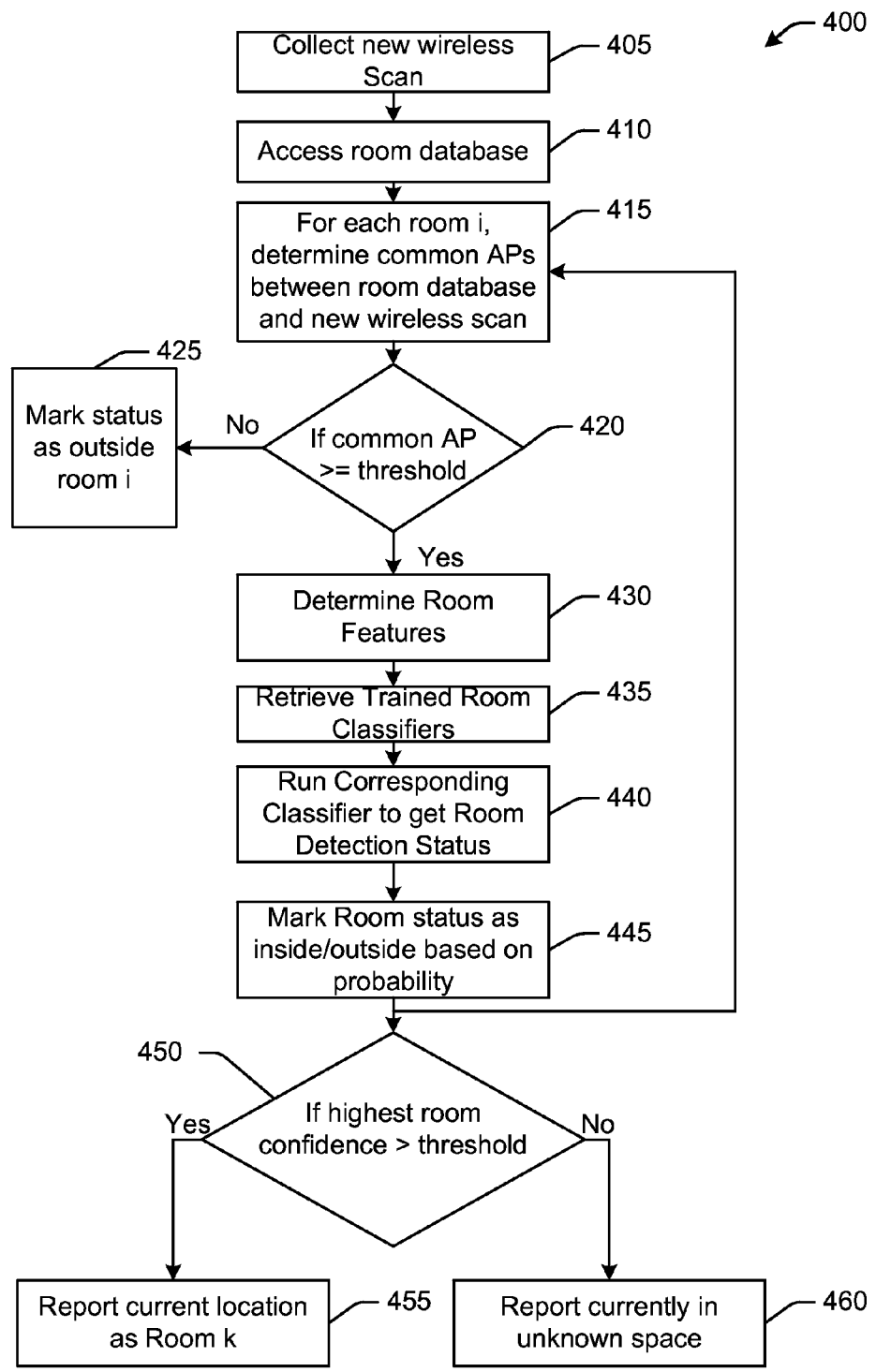
FIG. 4 is a flow diagram of an illustrative process for an adaptive multi-feature semantic location sensing in accordance with one or more embodiments of the disclosure.

FIG. 4 illustrates a flow diagram of illustrative process 400 for location determination for semantic location sensing systems in accordance with one or more embodiments of the disclosure.

At block 405, the semantic location sensing system(s) 248 may collect a new wireless scan W (e.g., Wi-Fi scan, Bluetooth scan, or any other wireless scan) that may indicate the signal strength (e.g., RSSI measurements) of the nearby APs (e.g., location device(s) 110). For example, a user (e.g., user(s) 102) may enter a room that may be within the range of wireless signals originating from various location devices, for instance, APs (e.g., from within a room or outside the room).

At block 410, the semantic location sensing system(s) 248 may access the saved Wi-Fi scans for a room (e.g., room i) from the data collection system(s) 246.

At block 415, the semantic location sensing system(s) 248 may determine common APs by comparing the APs IDs or RSSI measurements or using a set of RSSIs as the location signature (e.g., RSSI fingerprinting) of APs located in a particular room (e.g., room i) between the new wireless scan W and saved wireless scans. For example, if a user 102 enters a room (e.g., room i), the mobile device(s) 104 may collect wireless scans from proximate location device(s) 110 and may use collected scans from the learning stage to determine common location device(s) 100 between the wireless scans from the learning stage and wireless scans from the detection stage.

At block 420, the semantic location sensing system(s) 248 may remove or exclude distant rooms by checking common AP matches. For example, the semantic location sensing system(s) 248 may consider a room to be candidate room for consideration during the determination that that a user (e.g., user 102) may be in a particular room. Candidate rooms may be selected by determining that the number of common location device(s) 110 (e.g., APs) identified during the learning stage and the detection stage exceeds a threshold.

At block 425, the semantic location sensing system(s) 248 may mark a location status as located outside a room (e.g., room i) if the number of common APs did not meet the threshold. For example, if the number of common APs is, for example, less than three common APs, then semantic location sensing system(s) 248 may mark the location status as located outside room i. This may efficiently remove rooms that may contribute to less desirable results, may reduce computation and may improve detection robustness.

At block 430, the semantic location sensing system(s) 248 may determine the set of features of each room based upon, at least in part, the classifier training process. For example, as explained above in the training stage, a classifier for room i may be determined based upon the wireless features of room i. Running each room's classifier against the wireless scan W, may produce a result for the likelihood of being in a particular room. The result having the highest confidence may be selected as the likelihood of being in a particular room. For example, in an office space having three rooms A, B and C, a user (e.g., user 102) that may be using a user device (e.g., mobile device(s) 104) may need to detect his or her location. A learning stage may have been determined by the semantic location sensing system(s) 248 at an earlier stage or may be determined when the user 102 enters the room. As explained above, the learning stage may train or produce classifiers for each of the rooms that may be used at a later time to determine the likelihood that a user (e.g., user 102) may be in a particular location. Continuing with the example, during the learning stage, the semantic location sensing system(s) 248 may have produced a classifier for each of the three rooms A, B and C. The semantic location sensing system(s) 248 may determine that the user 102 may be in room A by first collecting wireless scans from proximate location devices 110 and running those scans against each classifier for the three rooms A, B and C. The result producing the highest confidence may show that the user 102 may be in room A.

At block 435, the semantic location sensing system(s) 248 may receive saved room classifier from the data collection system(s) 246 and may run (at block 440) the room's corresponding classifier to determine the likelihood that the user 102 is located in a particular room. For example, a room i may be associated with a classifier x based upon the wireless features of room i, wherein the classifier x may be applied to the new wireless scan to determine whether the location is in fact room i.

At block 445, the semantic location sensing system(s) 248 may mark each room status as being inside/outside based on a probability value. For example, for each distance metric (e.g., Euclidean distance), the semantic location sensing system(s) 248 may compute S statistical values (e.g., average, minimum, etc.) over $N_i$ distance values computed between different wireless scans and all room i reference scans.

At block 450, the semantic location sensing system(s) 248 may combine the detection results of an individual room by selecting the room with the highest probability above a predefined confidence threshold. For example, if the highest room confidence is greater than, for example 60%, then the probability confidence may be met. For example, if a user is located in room K, the semantic location sensing system(s) 248 may determine the likelihood that the user is that room (e.g., room K) if the highest probability is above the 60% threshold. It is understood that the above is only an example of a threshold and that other thresholds may be determined.

At block 455, the semantic location sensing system(s) 248 may report the current location of a room as known in case the probability confidence determined at block 440 is met.

At block 460, the semantic location sensing system(s) 248 may determine that, if no room satisfies the detection confidence threshold, the location engine reports unknown space, i.e. device is in an area not previously surveyed. By adjusting the room detection confidence threshold, tradeoff between false-alarm (false-positive) errors and miss-detection errors (false-negative) may be achieved.

AP Selection

Referring to FIG. 5a, which represents an example room layout having one or more AP's (e.g., the location device(s) 110) may be used to illustrate the selection of location devices 110 based on the layout.

The semantic location sensing system(s) 248 may detect a semantic location to distinguish two adjacent rooms that may be separated by, for example, a wall divider. For illustrative purposes, a Wi-Fi example will be described for distinguishing rooms in accordance with one or more embodiments of the disclosure, however, other wireless protocols may be equally described.

Typical Wi-Fi-based physical location sensing solutions may lead to high detection errors between adjacent rooms due to wall separations or other interfering objects. This adjacent room detection problem may become challenging in home or small office environments, where the Wi-Fi access points density may be low. For example, in a typical home environment, a mobile device may observe signals from less than 10 Wi-Fi APs from the current home and neighbors. Most rooms may have distinctive RSSI measurements from a subset of APs, but the rest of the RSSI measurements may be noisy, which may lead to high detection ambiguities. For example, when separating two adjacent rooms in a home, the signals received from distant APs may be very noisy due to human body attenuation and various other environment dynamics.

Referring to FIG. 5b, the semantic location sensing system(s) 248 may define candidate AP region to be around the room divided by a radius parameter R and angle parameter θ. For example, region 1 may be defined by a radius and an angle that may contain candidate APs for room classification and detection. The APs that may be located in these candidate regions (e.g., region 1 and/or region 2) may be considered useful or robust APs that may be used for room classification/detection.

In one embodiment, the semantic location sensing system(s) 248 may identify a more useful and robust AP subset between rooms that may or may not be adjacent by executing an AP pre-selection algorithm, and a new cross-room detector that may operate on the filtered AP subset to improve the adjacent room detection accuracy. In one embodiment, the semantic location sensing system(s) 248 may select APs based on either AP layout information (e.g., office building layout, etc.), and/or an information gain metric to quantify each AP's quality. Noisy and redundant APs from room location detection may reduce the impact of the RSSI variation that may lead to adjacent room detection ambiguities, thus making detection result more robust.

In one embodiment, eliminating at least one of the noisy and/or redundant APs may lower erroneous detection results and contamination from less reliable RSSIs. In one embodiment, AP selection may be performed by removing noisy APs without relying on a precise RSSI signal modeling through long time RSSI observation. The AP-selection algorithm may operate on room pair basis, leveraging the fact that different adjacent rooms usually require different subsets of APs to achieve optimal detection. This approach may reduce computation and memory requirement, by pre-filtering noisy APs, which may reduce the input data size for all feature computation and feature storage.

In an exemplary scenario, the mobile device(s) 104 may be located very close to the wall separating two adjacent rooms, the physical separation between locations on either side of the wall may be very small, and hence, may generate adjacent room detection errors which may contribute to room-level semantic location detection errors.

AP Selection Algorithms

Figure 6:
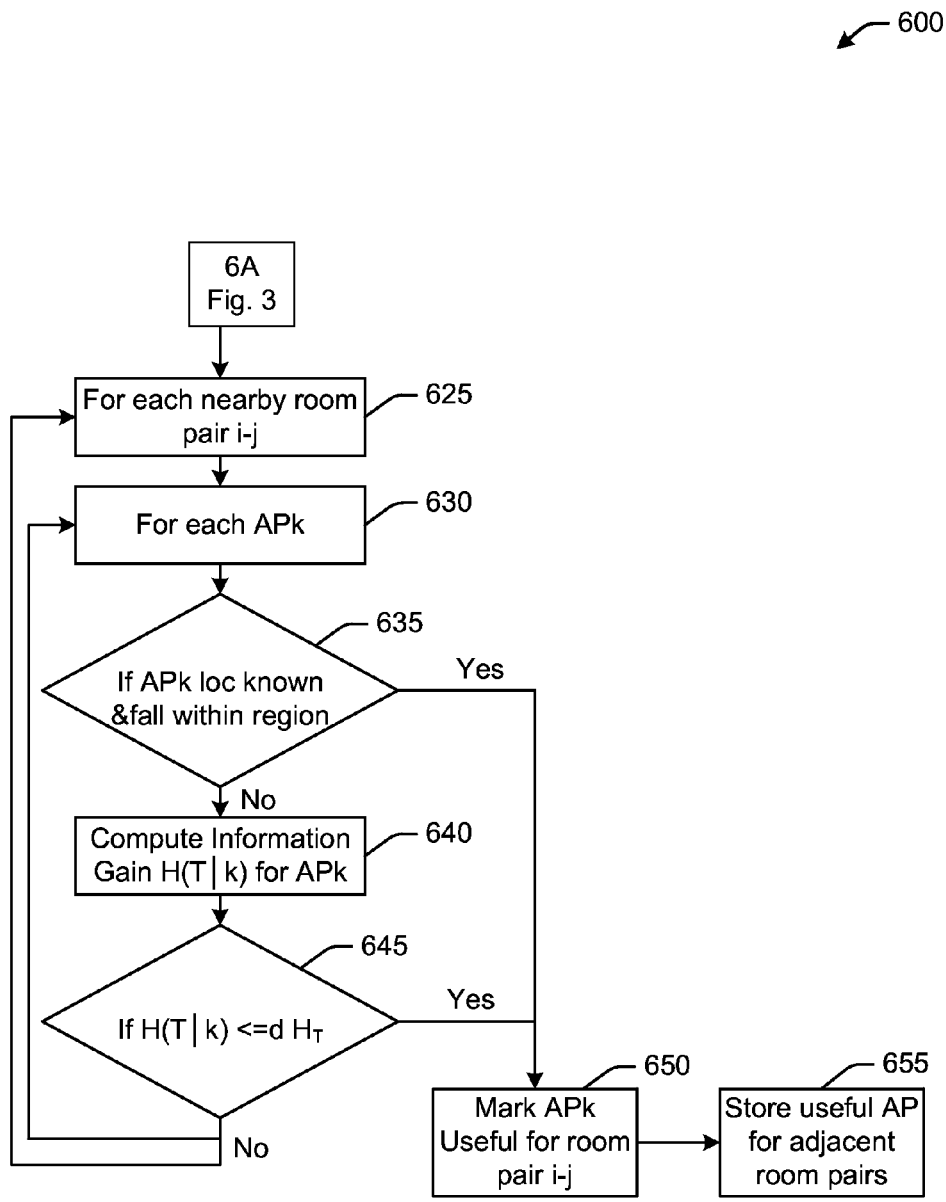
FIG. 6 is a flow diagram of an illustrative process for an adaptive multi-feature semantic location sensing in accordance with one or more embodiments of the disclosure.

Referring to FIG. 6, the semantic location sensing system(s) 248 may employ at least one of two approaches, or a combination thereof, may be used to select trustworthy wireless location devices (e.g., Wi-Fi APs) for semantic location sensing, which may be accomplished by selecting an AP subset for each adjacent room pair.

With reference to FIG. 3 and continuing from block 6A, FIG. 3, the semantic location sensing system(s) 248 may leverage AP layout within an area to determine a subset of APs that may distinguish adjacent rooms. With additional reference to FIG. 5a, an exemplary room layout is provided where a location device (e.g., location device 110A) may be perpendicular to the wall dividing room 1 and room 2, and a second location device (e.g., location device 110C) may be on the other side, perpendicular to the divider wall.

As shown from the floor map of FIG. 5a, the divider wall may create signal attenuation that may lead to different RSSIs at these two rooms for room classification. In this example, location device 110A and location device 110C may be used to distinguish room 1 and room 2 since their signals may need to penetrate the wall to reach the far-side of each room. Still referring to FIG. 5a, the signal of the location device 110B may penetrate the top-side walls of room 1 and room 2, may show similar RSSIs in room 1 and room 2, and thus may not be suitable for room classification.

At blocks 625 and 630, the semantic location sensing system(s) 248 may loop through each pair of rooms (i,j) and each $AP_k$, where i and j are rooms in a location and K is the number of proximate APs at that location, to determine one or more useful APs from the one or more adjacent rooms.

At block 635, and referring to FIG. 5b, the semantic location sensing system(s) 248 may define candidate AP region to be around the room divided by a radius parameter R and angle parameter θ. For example, region 1 may be defined by a radius and an angle that may contain candidate APs for room classification and detection. The APs that may be located in these candidate region (e.g., region 1 and/or region 2) may be considered useful or robust APs that may be used for room classification/detection.

At block 640, the semantic location sensing system(s) 248 may compute the information gain of location devices (e.g., APs) when AP location and room layout information is not available, e.g. in home or small office scenarios. The semantic location sensing system(s) 248 may employ an information-gain based approach to identify useful APs from room training samples (e.g., Wi-Fi samples). This may help identify candidate APs outside of the candidate AP regions (e.g., region 1 and/or region 2) described above. The semantic location sensing system(s) 248 may determine candidate APs that may provide the highest information gain (or entropy reduction) when their RSSI values may be used to classify a certain room pair. It is understood that the information gain concept may be defined as the entropy reduction from a prior state to a state that takes some information as given:

$$IG(T,a)=H(T)-H(T|a)$$

The entropy may be a measure of the room detection uncertainty level computed from the in-room probability p1 and p2 for room1 and room2:

$$H(T)=-p1*\log(p1)-p2*\log(p2)$$

For each AP a, a threshold-based binary room detector using RSSI from AP a may be used as follows:
If RSSIa>Ta: in room1
Else: in room2
The detection RSSI threshold Ta may be set to minimize the detection errors based on training data, and can be set based on training/survey data from room1 and room2.

The room information entropy H(T|a) may be computed by:

$$H(T|a)=-p1(\text{RSSI}a==Ta)*\log(p1(\text{RSSI}a==Ta))$$

$$-p2(\text{RSSI}a==Ta)*\log(p2(\text{RSSI}a==Ta))$$

Where p1(RSSIa==Ta) and p2(RSSIa==Ta) may be computed by the empirical distribution in survey data. Since the room entropy H(T) without knowing RSSIs from any APs may be considered a constant, the information gain of APs may be ranked based on their H(T|a). A lower H(T|a) value may indicate that an AP may provide more information gain, hence, the more robust/helpful the AP is for separating room1 and room2.

At block 645, the semantic location sensing system(s) 248 may define a threshold $H_T$ to select the APs that may provide enough information gain, and remove the rest of APs for room location detection that do not meet the threshold.

At block 650, in case the information gain may be lower than the threshold, the semantic location sensing system(s) 248 may mark the APs as possibly useful for you room detection.

At block 655, the semantic location sensing system(s) 248 may store using the data collection system(s) 266 a set of useful APs fors adjacent room pairs.

Cross-Room Classifier

Figure 7:
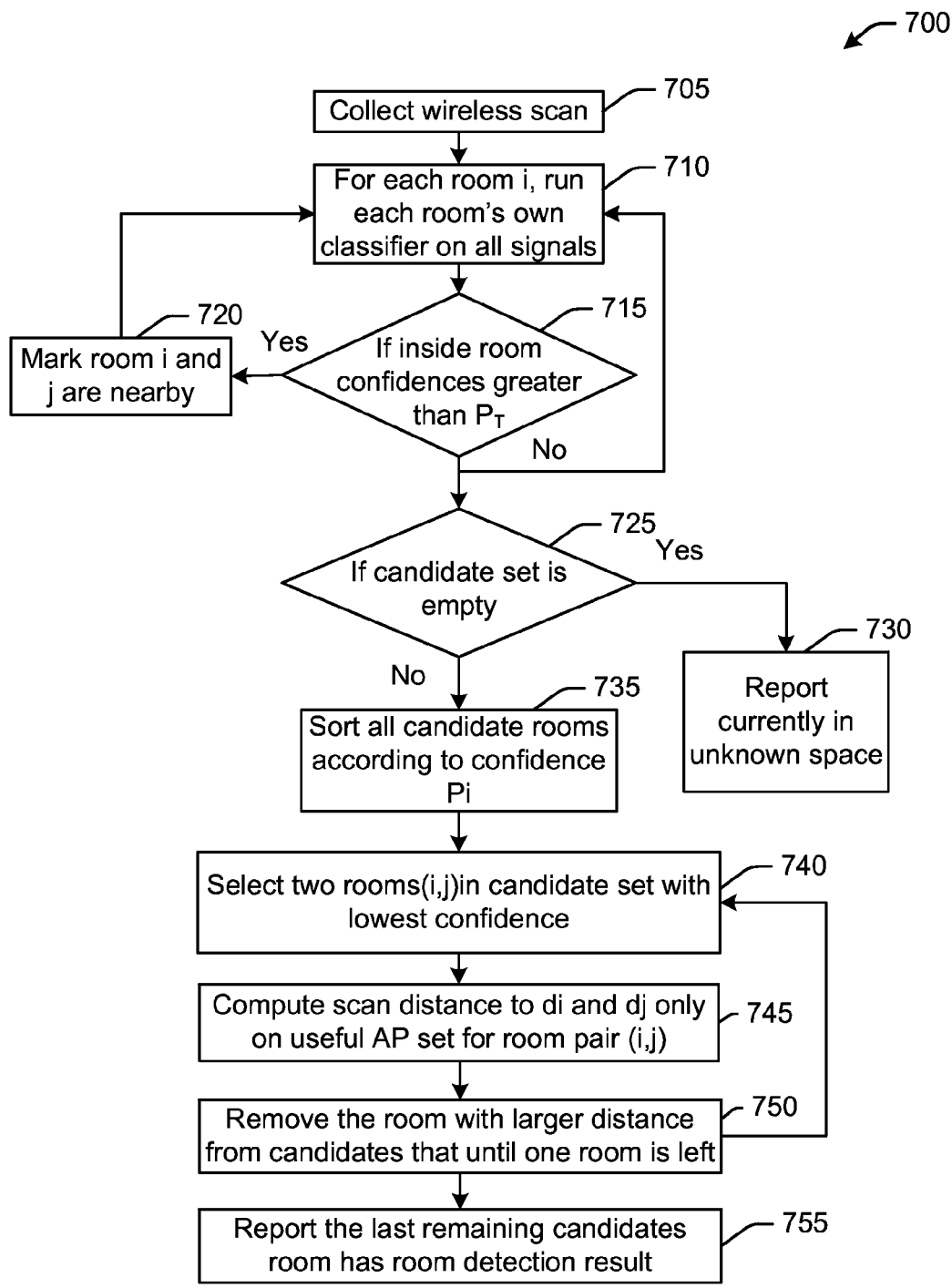
FIG. 7 is a flow diagram of an illustrative process for an adaptive multi-feature semantic location sensing in accordance with one or more embodiments of the disclosure.

Referring to FIG. 7, the semantic location sensing system(s) 248 may select an AP set for each room pair. In other words, cross-room classifiers may be determined in order to be used on different AP sets for different room pairs. For example, the semantic location sensing system(s) 248 may determine, based on the cross-room classifier, the likelihood that a user (e.g., user 102) may be present in a particular room. Instead of selecting the room with the highest probability and output detection results, a likelihood threshold $P_T$, e.g., 60%, may be determined, and as a result, output all candidate rooms with likelihood higher than $P_T$. Although the likelihood value in this step may not reflect the actual room due to reasons explained previously, the actual room usually falls in the candidate set.

At block 705, the semantic location sensing system(s) 248 may obtain new wireless scan (e.g., Wi-Fi scan, Bluetooth scan, or any other wireless scan).

At block 710, the semantic location sensing system(s) 248 may receive saved room classifier from the data collection system(s) 246 and may run the room's corresponding classifier to compute the room detection status for each relevant room.

At block 715, the semantic location sensing system(s) 248 may determine whether the inside room confidence is greater than $P_T$.

At block 720, the semantic location sensing system(s) 248 may mark rooms i and j as nearby.

At blocks 725 and 730, the semantic location sensing system(s) 248 may determine that if no candidate room is found, the semantic location sensing system(s) 248 may output "unknown" status.

At block 735, the semantic location sensing system(s) 248 may sort the candidate rooms according to their confidence levels.

At block 740, the semantic location sensing system(s) 248 may pick the two rooms with the lowest confidence, e.g. room i and j.

At block 745, the semantic location sensing system(s) 248 may use the AP set for room i and j learned, and may compute a distance metric of the new Wi-Fi scan to room i and j. An example of a distance metric may be simple Euclidean distance or other statistical measure that may capture the difference level between the current Wi-Fi scan and the room database.

At block 750, the semantic location sensing system(s) 248 may eliminate the room with larger distance (difference) from the candidate room set. This process may be repeated until there is only one room left in the candidate set, where the last room may be the final detection result.

At block 755, the semantic location sensing system(s) 248 may report the last remaining candidate room as the result of the detection.

In an example embodiment, there is disclosed a method. The method may include receiving, by a computing device comprising one or more processors, a set of wireless data scans associated with one or more access points at one or more locations, identifying, by the computing device, one or more features of the one or more locations based upon the set of wireless data scans, wherein the features are associated with one or more location metrics, determining, by the computing device, that at least one of the one or more access points is associated with a first location based upon, at least in part, the set of wireless data scans, generating, by the computing device, a first classifier for the first location based upon, at least in part, the one or more features and the associated access points. The method may further include determining that at least one of the one or more access points is associated with a first location includes determining whether a first access point of the one or more access points is located inside of a region of the first location. The region of the first location is defined by an angle and a radius associated with the first location. The method may further include determining that at least one of the one or more access points is associated with a first location includes determining whether an information gain value associated with a first access point is within a threshold. The set of wireless data scans may include wireless data scans from one or more first access points located inside the first location and wireless data scans from one or more second access points located outside the first location. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The method may further include generating the first classifier which may further include generating statistical values for the one or more features identified based upon the set of wireless data scans, wherein the statistical values include at least one of a minimum value, a maximum value, an average value, a standard deviation or a median value.

In another example embodiment, there is disclosed a method. The method may include receiving, by a server comprising one or more processors, a set of wireless data scans associated with one or more access points from a mobile device at a first location of a one or more location, accessing, by the server, one or more classifiers associated with the one or more locations, applying, by the server, one or more features that are identified based upon, at least in part, the one or more classifiers, to the set of wireless data scans, determining, by the server, that the mobile device is associated with the first location based upon the application of the features to the set of wireless data scans. The set of wireless data scans may include received signal strength indicator (RSSI) measurements from one or more access points associated with the first location. The method may further include determining that at least one of the one or more access points is associated with the first location includes determining whether a first access point of the one or more access points is located inside of a region based upon, at least in part, a layout of the first location. The region of the first location is defined by an angle and a radius associated with the first location. The method may further include determining that at least one of the one or more access points is associated with a first location includes determining whether an information gain value associated with a first access point associated with the first location is within a threshold. The first classifier is determined based upon, at least in part, one or more location metrics outputs, where the location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The method may further include generating the first classifier which may further include generating statistical values for the one or more features identified based upon the first set of wireless data scans, wherein the statistical values include at least one of a minimum value, a maximum value, an average value, a standard deviation or a median value.

In another example embodiment, there is disclosed a mobile device. The mobile device may include a transceiver configured to transmit and receive wireless signals, an antenna coupled to the transceiver, one or more processor in communication with the transceiver, at least one memory that stores computer-executable instructions, and at least one processor configured to access the at least one memory, wherein the at least one processor is configured to execute the computer-executable instructions to receive a set of wireless data scans, transmit a signal indicating the received wireless data scans to a remote server, receive, from the remote server, a semantic location information based upon, at least in part, the set of wireless data scans, and communicate the semantic location information, or a portion thereof, to an application executing on the mobile device. The one or more processors may be further configured to: identify one or more outputs from one or more location metrics associated with the one or more locations, determine that at least one of the one or more access points is associated with a first location based upon, at least in part, the first set of wireless data scans, and generate a first classifier for the first location based upon, at least in part, the one or more features. The at least one of the one or more access points may be associated with a first location may include determining whether a first access point of the one or more access points is located inside of a region of the first location. The region of the first location may be defined by an angle and a radius associated with the first location. The at least one of the one or more access points may be associated with a first location which may include determining whether an information gain value associated with a first access point associated with the first location is within a threshold. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. Generating the first classifier may further include generating statistical values for the one or more features identified based upon the first set of wireless data scans, wherein the statistical values include at least one of a minimum value, a maximum value, an average value, a standard deviation or a median value.

In another example embodiment, there is disclosed one or more computer-readable media storing computer-executable instructions. The one or more computer-readable media may store computer-executable instructions that, when executed by at least one processor, configure the at least one processor to perform operations which may include: receiving a set of wireless data scans associated with one or more access points at one or more locations, identifying one or more features of the one or more locations based upon the set of wireless data scans, wherein the features are associated with one or more location metrics, determining that at least one of the one or more access points is associated with a first location based upon, at least in part, the set of wireless data scans, and generating a first classifier for the first location based upon, at least in part, the one or more features and the associated access points. The at least one processor of the one or more computer-readable media may execute the computer-executable instructions to determine that at least one of the one or more access points may be associated with a first location which may include determining whether a first access point of the one or more access points is located inside of a region of the first location. The region of the first location may be defined by an angle and a radius associated with the first location. The at least one processor of the one or more computer-readable media may execute the computer-executable instructions to determine that at least one of the one or more access points may be associated with a first location which may include determining whether an information gain value associated with a first access point is within a threshold. The set of wireless data scans may include wireless data scans from one or more first access points located inside the first location and wireless data scans from one or more second access points located outside the first location. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The at least one processor of the one or more computer-readable media may execute the computer-executable instructions to generate the first classifier which may further include generating statistical values for the one or more features identified based upon the set of wireless data scans, wherein the statistical values include at least one of a minimum value, a maximum value, an average value, a standard deviation or a median value.

In another example embodiment, there is disclosed an apparatus. The apparatus may include one or more radios, one or more antennas, means for receiving a set of wireless data scans associated with one or more access points at one or more locations, means for identifying one or more features of the one or more locations based upon the set of wireless data scans, wherein the features are associated with one or more location metrics, means for determining that at least one of the one or more access points is associated with a first location based upon, at least in part, the set of wireless data scans, and means for generating a first classifier for the first location based upon, at least in part, the one or more features and the associated access points. The apparatus may further include means for determining that at least one of the one or more access points is associated with a first location includes means for determining whether a first access point of the one or more access points is located inside of a region of the first location. The region of the first location may be defined by an angle and a radius associated with the first location. The apparatus may further include means for determining that at least one of the one or more access points is associated with a first location includes means for determining whether an information gain value associated with a first access point is within a threshold. The set of wireless data scans may include wireless data scans from one or more first access points located inside the first location and wireless data scans from one or more second access points located outside the first location. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The apparatus may further include means for generating the first classifier which may further include means for generating statistical values for the one or more features identified based upon the set of wireless data scans, wherein the statistical values include at least one of a minimum value, a maximum value, an average value, a standard deviation or a median value.

In another example embodiment, there is disclosed a system. The system may include at least one memory that stores computer-executable instructions and at least one processor configured to access the at least one memory, wherein the at least one processor may execute computer-executable instructions. The instructions are to receive a set of wireless data scans associated with one or more access points at one or more locations, identify one or more features of the one or more locations based upon the set of wireless data scans, wherein the features are associated with one or more location metrics, determine that at least one of the one or more access points is associated with a first location based upon, at least in part, the set of wireless data scans, and generate a first classifier for the first location based upon, at least in part, the one or more features and the associated access points. The computer-executable instructions may include determining that at least one of the one or more access points is associated with a first location which may include determining whether a first access point of the one or more access points is located inside of a region of the first location. The region of the first location may be defined by an angle and a radius associated with the first location. The computer-executable instructions may include determining that at least one of the one or more access points is associated with a first location which may include determining whether an information gain value associated with a first access point is within a threshold. The set of wireless data scans may include wireless data scans from one or more first access points located inside the first location and wireless data scans from one or more second access points located outside the first location.

The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The computer-executable instructions may include generating the first classifier which may further include generating statistical values for the one or more features identified based upon the set of wireless data scans, wherein the statistical values include at least one of a minimum value, a maximum value, an average value, a standard deviation or a median value.

In another example embodiment, there is disclosed one or more computer-readable media storing computer-executable instructions. The one or more computer-readable media may store computer-executable instructions that, when executed by at least one processor, configure the at least one processor to perform operations which may include: receiving a set of wireless data scans associated with one or more access points from a mobile device at a first location of a one or more location, accessing one or more classifiers associated with the one or more locations, applying one or more features identified based upon, at least in part, the one or more classifiers, to the set of wireless data scans, and determining that the mobile device is associated with the first location based upon the application of the features to the set of wireless data scans. The set of wireless data scans may include received signal strength indicator (RSSI) measurements from one or more access points associated with the first location. The at least one processor of the one or more computer-readable media may execute the computer-executable instructions to determine that at least one of the one or more access points is associated with the first location which may include determining whether a first access point of the one or more access points is located inside of a region based upon, at least in part, a layout of the first location. The region of the first location may be defined by an angle and a radius associated with the first location. The at least one processor of the one or more computer-readable media may execute the computer-executable instructions to perform the operations comprising determining that at least one of the one or more access points is associated with a first location includes determining whether an information gain value associated with a first access point associated with the first location is within a threshold. The first classifier may be determined based upon, at least in part, one or more location metrics outputs, where the location metrics include at least one or more of a Standard Euclidean, a Pearson's correlation coefficient, a Cosine correlation coefficient, a Spearman rank order, a Hamming distance, or a Normalized Euclidean distance between two wireless signal measurements. The at least one processor of the one or more computer-readable media may execute the computer-executable instructions to generate the first classifier may further include generating statistical values for the one or more features identified based upon the first set of wireless data scans, wherein the statistical values include at least one of a minimum value, a maximum value, an average value, a standard deviation or a median value.

In another example embodiment, there is disclosed an apparatus. The apparatus may include one or more radios, one or more antennas, means for receiving a set of wireless data scans associated with one or more access points from a mobile device at a first location of a one or more location, means for accessing one or more classifiers associated with the one or more locations, means for applying one or more features identified based upon, at least in part, the one or more classifiers, to the set of wireless data scans, and means for determining that the mobile device is associated with the first location based upon the application of the features to the set of wireless data scans. The set of wireless data scans may include received signal strength indicator (RSSI) measurements from one or more access points associated with the first location. The apparatus may further include means for determining that at least one of the one or more access points is associated with the first location may include means for determining whether a first access point of the one or more access points is located inside of a region based upon, at least in part, a layout of the first location. The region of the first location may be defined by an angle and a radius associated with the first location. The apparatus may further include means for determining that at least one of the one or more access points is associated with a first location includes means for determining whether an information gain value associated with a first access point associated with the first location is within a threshold. The first classifier may be determined based upon, at least in part, one or more location metrics outputs, where the location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The apparatus may further include means for generating the first classifier which may further include means for generating statistical values for the one or more features identified based upon the first set of wireless data scans, wherein the statistical values include at least one of a minimum value, a maximum value, an average value, a standard deviation or a median value.

In another example embodiment, there is disclosed a system. The system may include at least one memory that stores computer-executable instructions, and at least one processor configured to access the at least one memory, wherein the at least one processor is configured to execute the computer-executable instructions to: receive a set of wireless data scans associated with one or more access points from a mobile device at a first location of a one or more location, access one or more classifiers associated with the one or more locations, apply one or more features identified based upon, at least in part, the one or more classifiers, to the set of wireless data scans, and determine that the mobile device is associated with the first location based upon the application of the features to the set of wireless data scans. The set of wireless data scans may include received signal strength indicator (RSSI) measurements from one or more access points associated with the first location. The computer-executable instructions may further include determining that at least one of the one or more access points is associated with the first location which may include determining whether a first access point of the one or more access points is located inside of a region based upon, at least in part, a layout of the first location. The region of the first location may be defined by an angle and a radius associated with the first location. The computer-executable instructions may include determining that at least one of the one or more access points is associated with a first location which may include determining whether an information gain value associated with a first access point associated with the first location is within a threshold. The first classifier may be determined based upon, at least in part, one or more location metrics outputs, where the location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The computer-executable instructions may include generating the first classifier which may further include generating statistical values for the one or more features identified based upon the first set of wireless data scans, wherein the statistical values include at least one of a minimum value, a maximum value, an average value, a standard deviation or a median value.

In another example embodiment, there is disclosed one or more computer-readable media storing computer-executable instructions. The one or more computer-readable media may store computer-executable instructions that, when executed by at least one processor, configure the at least one processor to perform operations which may include: receiving a set of wireless data scans, receiving location information based upon the received set of wireless data scans, and transmitting the location information to a process running on the mobile device. The at least one processor of the one or more computer-readable media may execute the computer-executable instructions to receiving a first set of wireless data scans associated with one or more access points at one or more locations, identifying one or more outputs from one or more location metrics associated with the one or more locations, determining that at least one of the one or more access points is associated with a first location based upon, at least in part, the first set of wireless data scans, and generating the first classifier for the first location based upon, at least in part, the one or more features. The at least one of the one or more access points may be associated with a first location includes determining whether a first access point of the one or more access points is located inside of a region of the first location. The region of the first location may be defined by an angle and a radius associated with the first location. The at least one processor of the one or more computer-readable media may execute the computer-executable instructions to determining that at least one of the one or more access points is associated with a first location may further include determining whether an information gain value associated with a first access point associated with the first location is within a threshold. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The at least one processor of the one or more computer-readable media may execute the computer-executable instructions to generating the first classifier may further include generating statistical values for the one or more features identified based upon the first set of wireless data scans, wherein the statistical values include at least one of a minimum value, a maximum value, an average value, a standard deviation or a median value.

In another example embodiment, there is disclosed an apparatus. The apparatus may include one or more radios, one or more antennas, means for receiving a set of wireless data scans, means for receiving location information based upon the received set of wireless data scans, and means for transmitting the location information to a process running on the mobile device. The apparatus may further include means for receiving a first set of wireless data scans associated with one or more access points at one or more locations, means for identifying one or more outputs from one or more location metrics associated with the one or more locations, means for determining that at least one of the one or more access points is associated with a first location based upon, at least in part, the first set of wireless data scans, and means for generating the first classifier for the first location based upon, at least in part, the one or more features. The apparatus may further include means for determining that at least one of the one or more access points is associated with a first location which may include means for determining whether a first access point of the one or more access points is located inside of a region of the first location. The region of the first location may be defined by an angle and a radius associated with the first location. The apparatus may further include means for determining that at least one of the one or more access points is associated with a first location which may include determining whether an information gain value associated with a first access point associated with the first location is within a threshold. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The apparatus may further include means for generating the first classifier which may further includes means for generating statistical values for the one or more features identified based upon the first set of wireless data scans, wherein the statistical values include at least one of a minimum value, a maximum value, an average value, a standard deviation or a median value.

In another example embodiment, there is disclosed a system. The system may include at least one memory that stores computer-executable instructions and at least one processor configured to access the at least one memory, wherein the at least one processor may execute computer-executable instructions. The instructions are to receive a set of wireless data scans, transmit a signal indicating the received wireless data scans to a remote server, receive, from the remote server, a semantic location information based upon, at least in part, the set of wireless data scans, and communicate the semantic location information, or a portion thereof, to an application executing on the system. The computer-executable instructions may include identify one or more outputs from one or more location metrics associated with the one or more locations, determine that at least one of the one or more access points is associated with a first location based upon, at least in part, the first set of wireless data scans, and generate a first classifier for the first location based upon, at least in part, the one or more features. The computer-executable instructions may include determining that at least one of the one or more access points is associated with a first location which may include determining whether a first access point of the one or more access points is located inside of a region of the first location. The region of the first location may be defined by an angle and a radius associated with the first location. The computer-executable instructions may include determining that at least one of the one or more access points is associated with a first location which may include determining whether an information gain value associated with a first access point associated with the first location is within a threshold. The location metrics may include at least one or more of a Standard Euclidean, a Pearson's correlation coefficient, a Cosine correlation coefficient, a Spearman rank order, a Hamming distance, or a Normalized Euclidean distance between two wireless signal measurements. The computer-executable instructions may include to generate the first classifier may further include to generate statistical values for the one or more features identified based upon the first set of wireless data scans, wherein the statistical values include at least one of a minimum value, a maximum value, an average value, a standard deviation or a median value.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
    receiving, by a computing device comprising one or more processors, a set of wireless data scans associated with one or more access points at one or more locations;
    identifying, by the computing device, two or more features of the one or more locations based upon the set of wireless data scans, wherein the two or more features are associated with one or more location metrics;
    determining, by the computing device, a similarity score between a first location and a second location;
    determining, by the computing device, the first location is adjacent to the second location based at least in part on determining the similarity score is less than a predetermined value;

determining, by the computing device, that at least one of the one or more access points is associated with the first location based upon, at least in part, the set of wireless data scans; and generating, by the computing device, a first classifier associated with a semantic location information for the first location based upon, at least in part, the two or more features and the one or more access points.

2. The method of claim 1, wherein determining that at least one of the one or more access points is associated with the first location includes determining whether a first access point of the one or more access points is located inside of a region of the first location.

3. The method of claim 2, wherein the region of the first location is defined by an angle and a radius associated with the first location.

4. The method of claim 1, wherein determining that at least one of the one or more access points is associated with the first location includes determining whether an information gain value associated with a first access point is within a threshold.

5. The method of claim 1, wherein the set of wireless data scans includes second wireless data scans from one or more first access points located inside the first location and third wireless data scans from one or more second access points located outside the first location.

6. The method of claim 1, wherein the location metrics include at least one or more of a Standard Euclidean, a Pearson's correlation coefficient, a Cosine correlation coefficient, a Spearman rank order, a Hamming distance, or a Normalized Euclidean distance between two wireless signal measurements.

7. The method of claim 1, wherein generating the first classifier further includes generating statistical values for the one or more features identified based upon the set of wireless data scans, wherein the statistical values include at least one of a minimum value, a maximum value, an average value, a standard deviation or a median value.

8. A mobile device, comprising:
a transceiver configured to transmit and receive wireless signals;
an antenna coupled to the transceiver;
one or more processor in communication with the transceiver;
at least one memory that stores computer-executable instructions; and
at least one processor configured to access the at least one memory, wherein the at least one processor is configured to execute the computer-executable instructions to:

receive a set of wireless data scans;
transmit a signal indicating the received set of wireless data scans to a remote server;
receive, from the remote server, a semantic location information based upon, at least in part, the set of wireless data scans; and
determine a similarity score between a first location and a second location;
determine the first location is adjacent to the second location based at least in part on determining the similarity score is less than a predetermined value;
communicate the semantic location information, or a portion thereof, to an application executing on the mobile device; and
generate a first classifier associated with the semantic location information for the first location based upon, at least in part, two or more features.

9. The mobile device of claim 8, wherein the one or more processors are further configured to:
identify one or more outputs from one or more location metrics associated with the one or more locations; and
determine that at least one access point of one or more access points is associated with a first location based upon, at least in part, the set of wireless data scans.

10. The mobile device of claim 9, wherein determining that the at least one access point is associated with a first location includes determining whether a first access point of the one or more access points is located inside of a region of the first location.

11. The mobile device of claim 10, wherein the region of the first location is defined by an angle and a radius associated with the first location.

12. The mobile device of claim 9, wherein determining that the at least one access point is associated with a first location includes determining whether an information gain value associated with a first access point associated with the first location is within a threshold.

13. The mobile device of claim 9, wherein the location metrics include at least one or more of a Standard Euclidean, a Pearson's correlation coefficient, a Cosine correlation coefficient, a Spearman rank order, a Hamming distance, or a Normalized Euclidean distance between two wireless signal measurements.

14. The mobile device of claim 9, wherein generating the first classifier further includes generating statistical values for the one or more features identified based upon the set of wireless data scans, wherein the statistical values include at least one of a minimum value, a maximum value, an average value, a standard deviation or a median value.

* * * * *